(12) United States Patent
Lee et al.

(10) Patent No.: US 11,644,088 B2
(45) Date of Patent: May 9, 2023

(54) REDUCER

(71) Applicant: Chong Hui Lee, Busan (KR)

(72) Inventors: Chong Hui Lee, Busan (KR); Eui Jin Jeong, Busan (KR)

(73) Assignee: Chong Hui Lee, Busan (KR)

( * ) Notice: Subject to any disclaimer, the term of this patent is extended or adjusted under 35 U.S.C. 154(b) by 0 days.

(21) Appl. No.: 17/627,699

(22) PCT Filed: Jul. 15, 2020

(86) PCT No.: PCT/KR2020/009292
§ 371 (c)(1),
(2) Date: Jan. 17, 2022

(87) PCT Pub. No.: WO2021/010738
PCT Pub. Date: Jan. 21, 2021

(65) Prior Publication Data
US 2022/0316562 A1 Oct. 6, 2022

(30) Foreign Application Priority Data

Jul. 18, 2019 (KR) .......................... 10-2019-0087013

(51) Int. Cl.
*F16H 13/08* (2006.01)
(52) U.S. Cl.
CPC .................................... *F16H 13/08* (2013.01)
(58) Field of Classification Search
CPC ................................ F16H 13/08; F16H 49/005
USPC ......................................... 475/163, 165, 168
See application file for complete search history.

(56) References Cited

U.S. PATENT DOCUMENTS

| 3,477,315 A * | 11/1969 | Macks ................... H02K 7/083 310/83 |
| 6,314,826 B1 * | 11/2001 | Cunningham .......... F16H 25/06 475/168 |
| 8,998,763 B2 * | 4/2015 | Wengenroth ............ F16H 25/06 475/168 |

(Continued)

FOREIGN PATENT DOCUMENTS

| JP | 06-109084 A | 4/1994 |
| JP | 2004-251374 A | 9/2004 |

(Continued)

OTHER PUBLICATIONS

International Search Report for PCT/KR2020/009292 dated Oct. 15, 2020 from Korean Intellectual Property Office.

*Primary Examiner* — Derek D Knight
(74) *Attorney, Agent, or Firm* — Revolution IP, PLLC

(57) ABSTRACT

The present invention relates to a reducer (10) comprising: a hollow input shaft (100) having a driving surface (110) therein; an output shaft (200) which is accommodated inside the input shaft (100) and having an output shaft body (210) having an output shaft gear (220) formed along the circumferential direction on the outer surface; a plurality of rollers (R) aligned between the output shaft (200) and the driving surface (110) and extending in the axial direction; and ring-shaped caps (300) positioned on both sides of the axial direction of the rollers (R), wherein the rollers (R) are guided to move in the radial direction by means of the caps (300) and, when the input shaft (100) rotates, the rollers (R) are pressurized against the driving surface (110) to pressurize the output shaft gear (200), so that the output shaft (200) rotates.

7 Claims, 4 Drawing Sheets

(56) References Cited

U.S. PATENT DOCUMENTS

| | | | |
|---|---|---|---|
| 10,174,818 B2 * | 1/2019 | Klassen | ............... F16H 1/28 |
| 2013/0186213 A1 | 7/2013 | Lim | |
| 2017/0009867 A1 | 1/2017 | Liang et al. | |
| 2018/0372187 A1 | 12/2018 | Tsai et al. | |

FOREIGN PATENT DOCUMENTS

| | | |
|---|---|---|
| JP | 2017-020643 A | 1/2017 |
| KR | 10-1009742 B1 | 1/2011 |

* cited by examiner

REDUCER

TECHNICAL FIELD

The present invention relates to a reducer, and more specifically, a reducer that is capable of being improved in precision and durability, simple in configuration to be easily manufactured, saved in a machining cost, and remarkably reducing the occurrence of noise and vibrations.

BACKGROUND ART

Generally, a reducer is a device that reduces a high speed/low torque rotational force received from a power unit to a given rate and outputs a low speed/high torque rotational force. The reducer is largely classified into a harmonic reducer and a cycloid reducer.

As widely known, the harmonic reducer includes an oval-shaped wave generator, an elastic deforming part disposed on the outside of the wave generator, and an outer gear disposed on the outside of the elastic deforming part and coupled to the elastic deforming part. The wave generator functions as an input shaft, and if the wave generator rotates, the elastic deforming part is deformedly coupled to the inner periphery of the outer gear and thus rotates, so that the elastic deforming part functions as an output shaft and rotates while being reduced in rotational speed.

Further, as widely known, the cycloid reducer is configured to allow a cycloid disc to eccentrically rotate by means of an eccentric movement of an input shaft. Pins are provided around the cycloid disc, and accordingly, the cycloid disc comes into contact with the pins and thus rotates. As a result, an output shaft interlocked with the cycloid disc rotates while being reduced in rotational speed.

However, the conventional harmonic reducer may have low durability due to the breakage of the elastic deforming part, and the conventional cycloid reducer is hard to be machined to an accurate shape, which undesirably causes a high machining cost.

Further, the harmonic reducer and the cycloid reducer are suggested in prior arts as will be described below, and specific explanations of the reducers will be avoided for the brevity of the description.

DISCLOSURE

Technical Problem

Accordingly, the present invention has been made in view of the above-mentioned problems occurring in the related art, and it is an object of the present invention to provide a reducer that is capable of being improved in precision and durability, simple in configuration to be easily manufactured, saved in a machining cost, and suppressing the occurrence of noise and vibrations to the maximum.

Technical Solution

To accomplish the above-mentioned objects, according to the present invention, there is provided a reducer including: a hollow input shaft having a driving surface formed on the inside thereof; an output shaft accommodated inside the input shaft and having an output shaft body and an output shaft gear formed on an outer peripheral surface of the output shaft body in a circumferential direction of the output shaft body; a plurality of rollers alignedly disposed between the output shaft and the driving surface and extending axially; and ring-shaped caps positioned on both axial sides of the plurality of rollers, wherein a radial movement of the plurality of rollers is guided by means of the caps, and if the input shaft rotates, the plurality of rollers is pressurized against the driving surface to thus pressurize the output shaft gear, so that the output shaft rotates.

According to the present invention, each cap may have a plurality of guide grooves spaced apart from one another on an axial inner surface thereof in a circumferential direction thereof to guide the plurality of rollers radially, and both longitudinal sides of the plurality of rollers are inserted into the guide grooves and guided in the radial movement, so that as the plurality of rollers is pressurized against the driving surface to thus pressurize the output shaft gear, the output shaft rotates.

According to the present invention, the reducer may further include elastic rings adapted to insert the output shaft thereinto, located on both axial sides of the output shaft gear, and to outwardly pressurize the rollers toward the driving surface.

According to the present invention, the reducer may further include extension portions extending axially from both sides of the output shaft body and located inside the caps and output shaft members coupled to the extension portions on axial outer surfaces thereof and rotating integrally with the output shaft.

According to the present invention, each cap may have a ring-shaped body, the guide grooves formed on a first side surface as the axial inner surface of the cap body, and a first seating portion formed on a second side surface as an axial outer surface of the cap body to seat the corresponding output shaft member thereonto, the first seating portion protruding by a given distance outwardly from the inner peripheral end of the second side surface and having a thickness reduced by a given depth to form a stepped protrusion, between the corresponding output shaft member and the corresponding first seating portion being disposed a second bearing, and the output shaft members and the output shaft are coupled to one another by means of fixing members and rotate integrally with one another.

According to the present invention, each cap may have a second seating portion formed steppedly by a given thickness on an outer end periphery of the second side surface of the cap body as the side surface toward the input shaft, and between the second seating portions and the input shaft are disposed first bearings.

According to the present invention, each cap member may have insertion grooves formed on the bottom thereof in a circumferential direction thereof, and each first seating portion may have insertion holes passing therethrough in a circumferential direction thereof, so that through coupling pins inserted into the insertion grooves and the insertion holes, the cap members and the caps rotate integrally with one another.

Effective Advantages of the Invention

According to the present invention, the reducer has an improvement in durability thereof and is configured to have the elastic rings adapted to pressurize the rollers toward the driving surface to suppress noise and vibrations from being generated from the operations of the rollers, to allow machining errors among the components to be offset thereby to suppress operational failures or noise generation caused by the machining errors, configured to allow the caps located on both axial sides thereof to guide the radial movements of the rollers so that as the caps are alignedly fixed to both sides thereof, the rotation failure caused by the fitting of the rollers can be prevented and the inclinations of the rollers can be suppressed, configured to allow both longitudinal ends of the rollers to be inserted into the guide grooves formed on the caps and thus guided in the radial movements so that no additional components for guiding the rollers between the caps are needed to thus provide a simple configuration and easy manufacturing, and configured to allow both ends of the rollers to be guidedly moved by the guide grooves to provide a small loss torque through the reduction of sliding frictional areas of the rollers.

MODE FOR INVENTION

Figure 1:
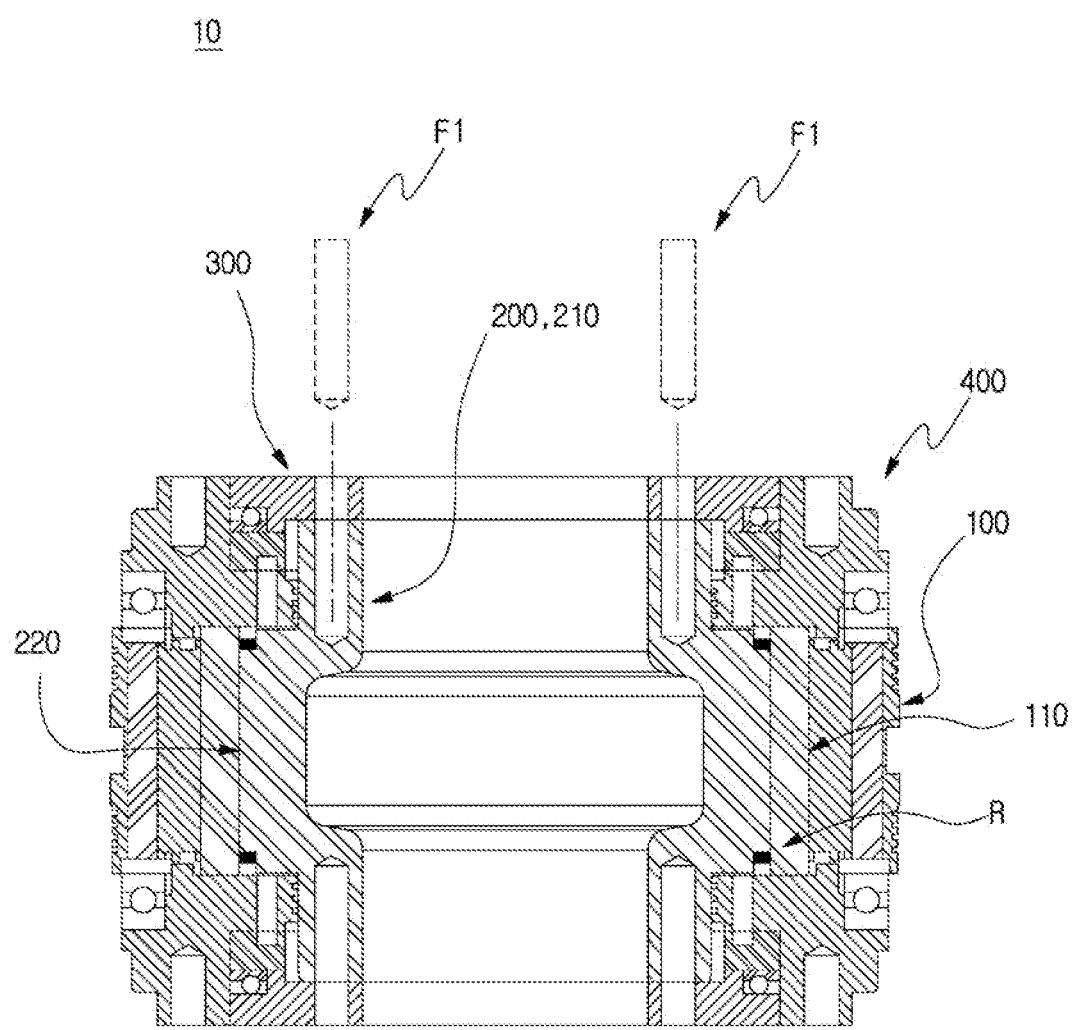
FIG. 1 is a schematic sectional view showing a reducer according to the present invention.

Hereinafter, the present invention will be explained in detail with reference to the attached drawings. In the description, the thicknesses of the lines or the sizes of the components shown in the drawing may be magnified for the clarity and convenience of the description.

Figure 2:
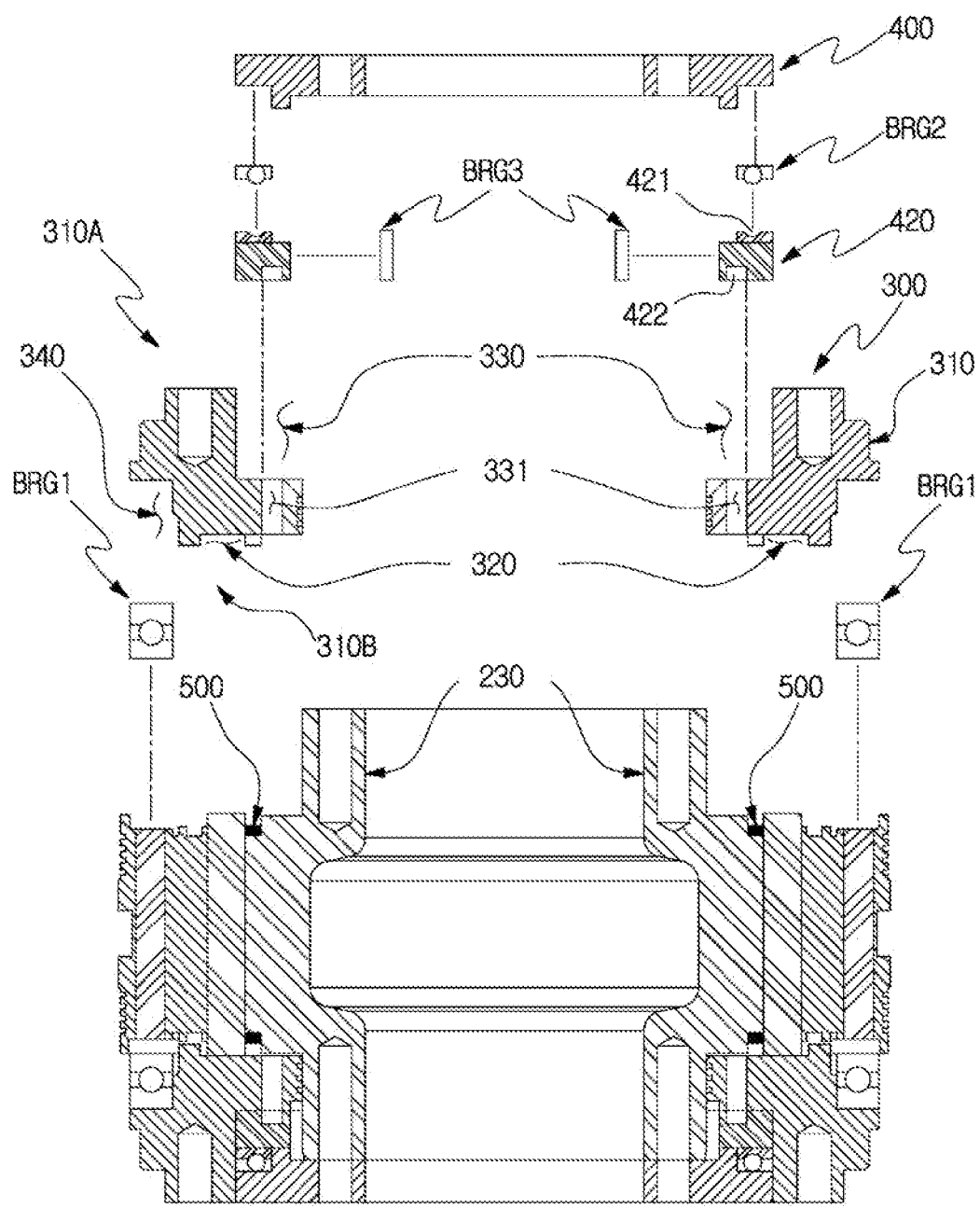
FIG. 2 is a partially exploded sectional view showing the reducer according to the present invention.
Figure 3:
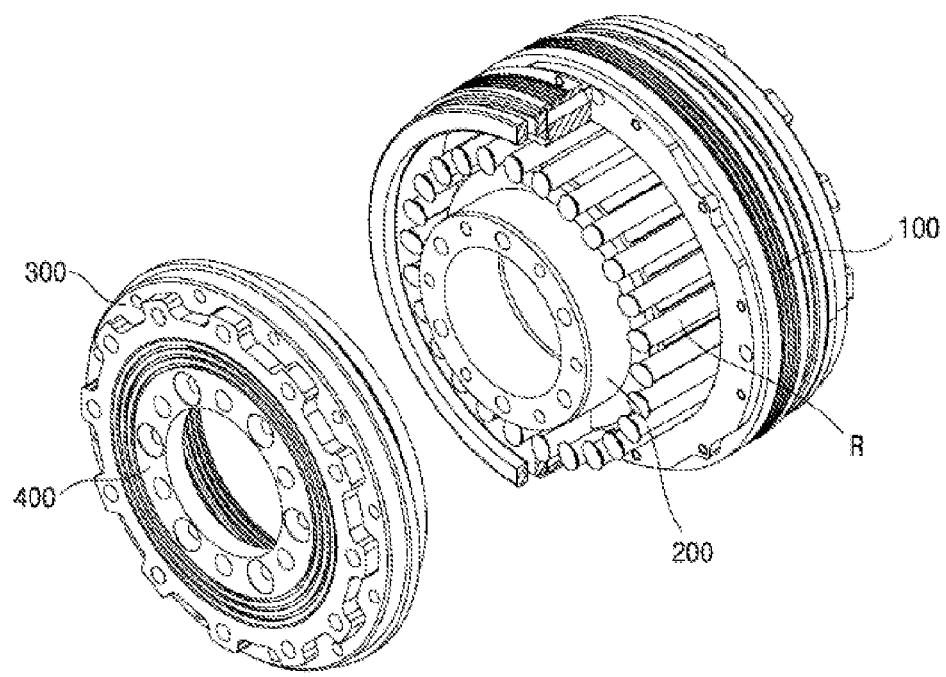
FIG. 3 is a partially exploded perspective view showing the reducer according to the present invention.
Figure 4:
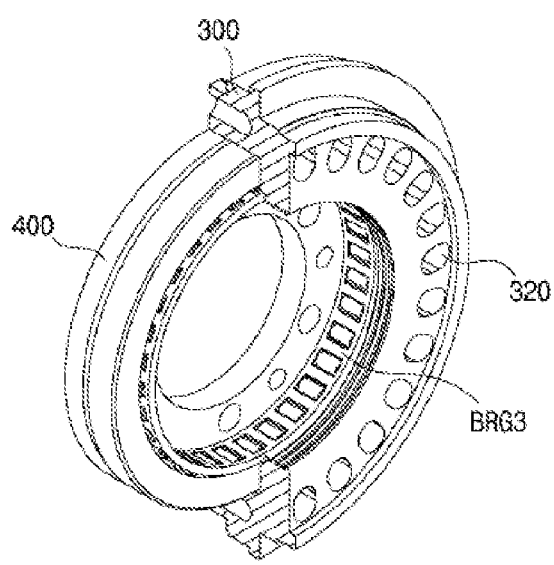
FIG. 4 is a partially sectional perspective view showing the opposite surfaces of a cap and an output shaft of the reducer according to the present invention.
Figure 5:
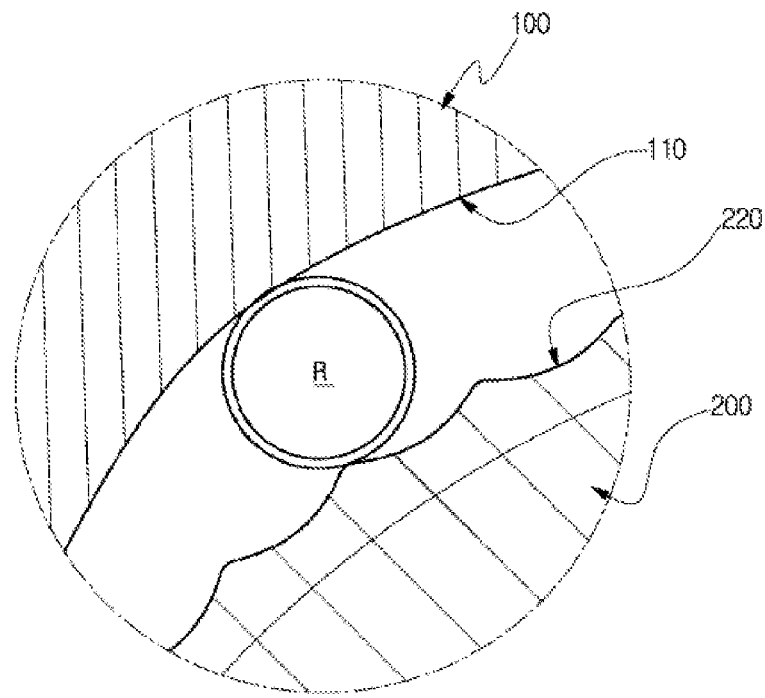
FIGS. 5 and 6 are partially enlarged views showing operating relations of the reducer according to the present invention.
Figure 6:
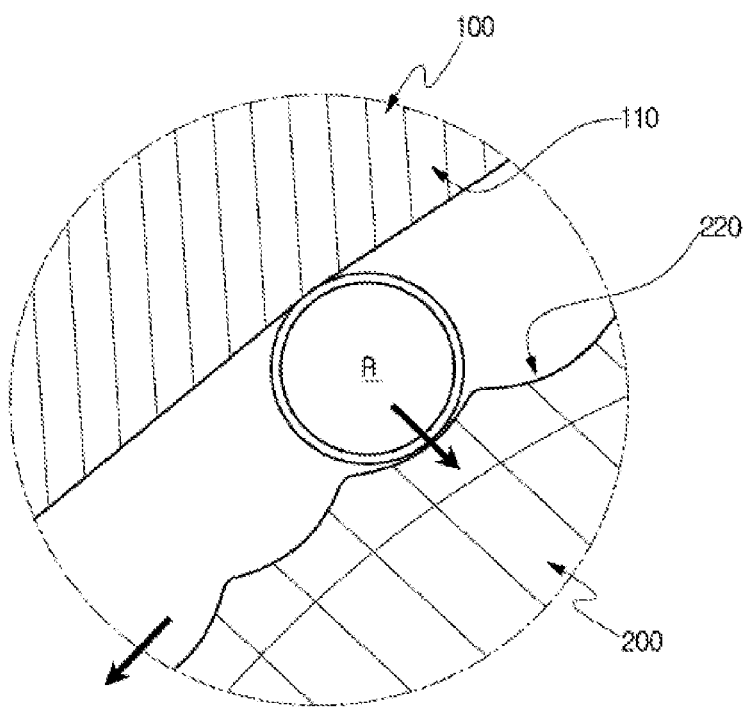

FIG. 1 is a schematic sectional view showing a reducer according to the present invention, FIG. 2 is a partially exploded sectional view showing the reducer according to the present invention, FIG. 3 is a partially exploded perspective view showing the reducer according to the present invention, FIG. 4 is a partially sectional perspective view showing the opposite surfaces of a cap and an output shaft of the reducer according to the present invention, and FIGS. 5 and 6 are partially enlarged views showing operating relations of the reducer according to the present invention.

As shown in FIGS. 1 to 6, a reducer 10 according to the present invention includes an input shaft 100 for receiving power from the outside, an output shaft 200 interlocked with the input shaft 100 and thus reduced in rotational speed, and a plurality of rollers R disposed between the input shaft 100 and the output shaft 200.

The input shaft 100 is a hollow body and has a driving surface 110 located on the inside thereof and having one or more protruding portions. The driving surface 110 may have the shape of an oval with two protruding portions protruding therefrom at an angle of 180° with respect to each other.

The output shaft 200 is accommodated inside the input shaft 100. The plurality of rollers R is alignedly disposed between the output shaft 200 and the driving surface 110 and extends in an axial direction thereof.

Further, ring-shaped caps 300 are disposed on both axial sides of the plurality of rollers R, and the output shaft 200 includes an output shaft body 210 disposed inside the input shaft 100. Further, the output shaft 200 has an output shaft gear 220 disposed on the outer peripheral surface of the output shaft body 210 in a circumferential direction thereof.

The number of rollers R is smaller than the number of teeth of the output shaft gear 220.

Each cap 300 has a plurality of guide grooves 320 spaced apart from one another on an axial inner surface thereof in a circumferential direction thereof and extending radially. The guide grooves 320 may be through holes extending from a radial inner end portion of the cap 300 to the outer end portion thereof. Each guide groove 320 has the shape of a long hole extending radially to a given length, and in specific, the guide groove 320 has concavely rounded portions facing each other on the inner and outer radial sides thereof and extending portions facing each other in parallel with each other as the inner and outer radial ends thereof are connected to the rounded portions sides thereof.

The guide grooves 320 serve to slidingly insert both longitudinal sides of the plurality of rollers R thereinto in radial directions thereof, and accordingly, the rollers R are guided along the guide grooves 320 and perform radial movements. In specific, the rollers R are pressurized against the output shaft 200 located at the insides thereof by means of the pressurization of the driving surface 110 of the input shaft 100 thereagainst and thus pressurize the output shaft gear 220, so that the output shaft 200 rotates, which will be discussed later.

According to the present invention, the reducer 10 further includes elastic rings 500 adapted to insert the output shaft 200 thereinto, located on both axial sides of the output shaft gear 220, and to outwardly pressurize the rollers R toward the driving surface 110. If pressurizing toward the driving surface 110 is released, the rollers R pressurized inwardly move outwardly and return to original positions thereof.

The oval-shaped driving surface 110 of the input shaft 100 will be explained below, and as shown in FIG. 5, in the case where the oval-shaped driving surface 110 of the input shaft 100 has a long axis, the rollers R are disposed on the outside of the output shaft gear 220 by means of the elastic rings 500. In this case, as shown in FIG. 6, if the input shaft 10 rotates to allow the oval-shaped driving surface 110 to have a short axis, the rollers R are pressurized against the driving surface 110 and move inwardly. Through the movements of the rollers R, the output shaft gear 220 of the output shaft 200 is pressurized to thus allow the output shaft 200 to rotate.

Further, the inwardly moving rollers R move outwardly and return to the original positions thereof by means of the elastic rings 500.

The output shaft 200 includes extension portions 230 extending axially from both sides of the output shaft body 210 and located inside the caps 300. According to the present invention, the reducer 10 further includes output shaft members 400 coupled to the extension portions 230 on the outsides in the axial direction thereof and rotating integrally with the output shaft 200.

The rotation of the input shaft 100 is transferred to the output shaft 200, and accordingly, the output shaft 200 rotates, while being reduced in rotational speed. In this case, the output shaft members 400 rotate together with the output shaft 200.

The caps 300 are disposed independently from the output shaft 200 and the output shaft members 400 and kept fixed, without rotating.

Each cap 300 has a ring-shaped body 310. The guide grooves 320 are formed on an inner axial surface 310B (hereinafter, referred to as a first side surface) of the cap body 310.

As mentioned above, the guide grooves 320 are spaced apart from one another in the circumferential direction of the cap 300 and have radially long axes. Of course, the guide grooves 320 may have shapes of radial through holes. Both longitudinal sides of the rollers R are inserted into the guide grooves 320 of the caps 300, and the radial movements of the rollers R are guided by the guide grooves 320. As mentioned above, the rollers R move inwardly or outwardly in a radial direction through the pressurization of the input shaft 100 thereagainst. That is, both longitudinal sides of the rollers R are inserted into the guide grooves 320 of the caps 300, and the radial movements of the rollers R are guided by the guide grooves 320.

Each cap 300 has a first seating portion 330 formed on an axial outer surface 310A (hereinafter, referred to as a second side surface) of the cap body 310 to seat the corresponding output shaft member 400 thereonto. The first seating portion 330 protrudes by a given distance outwardly from the inner peripheral end of the second side surface 310A and has a thickness reduced by a given depth to form a stepped protrusion. Further, a second bearing BRG2 is disposed between the corresponding output shaft member 400 and the corresponding first seating portion 330. As shown in FIGS. 1 and 2, an axial bearing for rotatably supporting an axial load is used as the second bearing BRG2, but it is possible that a bearing such as an angular contact bearing supporting both of a radial load and an axial load may be used as the second bearing BRG2. If the second bearing BRG2 is formed of the bearing supporting both of a radial load and an axial load, a third bearing BRG3 as will be discussed below may not be provided.

In this case, the output shaft members 400 and the output shaft 200 are coupled to each other by means of fixing members F1 and thus rotate integrally with each other. The output shaft members 400 and the output shaft 200 are brought into close contact with each other by means of the fixing members F1. The output shaft 200 has a plurality of axially concave fixing member grooves (having no reference numerals) formed spaced apart from one another on axial end peripheries in a circumferential direction thereof, respectively, and each output shaft member 400 has a plurality of fixing member holes (having no reference numerals) spaced apart from one another in a circumferential direction thereof and passing therethrough in an axial direction thereof, so that the fixing members F1 are press-fitted to the fixing member holes and the fixing member grooves.

The output shaft members 400 rotate integrally with the output shaft 200, and the caps 300 are in a fixed state. Accordingly, the second bearings BRG2 are disposed between the output shaft members 400 and the caps 300, respectively.

Each second bearing BRG2 includes a cap member 420 and a plurality of rolling elements (not shown). The cap member 420 has the shape of a ring and is seated on the corresponding first seating portion 330. The cap member 420 has a concave groove 421 formed on an axial outer surface toward the corresponding output shaft member 400 in a circumferential direction thereof.

The rolling elements are aligned between the concave groove 421 and the rounded axial inner surface of the corresponding output shaft member 400 facing the concave groove 421. In this case, the surfaces of the rounded axial inner surface of the corresponding output shaft member 400, which come into contact with the rolling elements, become flat.

As described above, the output shaft members 400 and the output shaft 200 are coupled to one another by means of the fixing members F1, and the caps 300 are pressurized against the output shaft members 400 and thus come into contact with the input shaft 100. In this case, the input shaft 100 rotates, and since the caps 300 are in a fixed state, first bearings BRG1 are disposed between the input shaft 100 and the caps 300, respectively.

So as to locate the first bearings BRG1 between the input shaft 100 and the caps 300, respectively, each cap 300 has a second seating portion 340 formed on an outer end periphery of the first side surface 310B of the cap body 310 as the side surface toward the input shaft 100 and reduced in thickness by a given depth to form a stepped protrusion. Accordingly, the first bearings BRG1 are disposed between the second seating portions 340 and the input shaft 100, respectively.

Further, third bearings BRG3 are disposed between the extension portions 230 of the output shaft 200 and the cap members 420, respectively. As mentioned above, the extension portions 230 are reduced in rotation by means of the input shaft 100, and since the cap members 420 are kept fixed, the third bearings BRG3 are disposed between the extension portions 230 of the output shaft 200 and the cap members 420, respectively. In this case, a radial bearing supporting a radial load is used as the third bearings BRG3.

Further, coupling pins (not shown) are used to couple the cap members 420 and the cap bodies 310. To do this, each cap member 420 has insertion grooves 422 formed on the bottom thereof in a circumferential direction thereof, and each first seating portion 330 has insertion holes 331 passing therethrough in a circumferential direction thereof. Accordingly, both sides of the coupling pins are inserted into the insertion grooves 422 and the insertion holes 331, and the cap members 420 and the caps 300 rotate integrally with one another by means of the inserted coupling pins.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

INDUSTRIAL APPLICABILITY

According to the present invention, the reducer has an improvement in durability thereof and is configured to have the elastic rings adapted to pressurize the rollers toward the driving surface to suppress noise and vibrations from being generated from the operations of the rollers, to have no additional components for guiding the rollers between the caps to provide a simple configuration and easy manufacturing, and to allow both ends of each roller to guidedly move by the guide grooves to provide a small loss torque through the reduction of a sliding frictional area of the roller.

The invention claimed is:

1. A reducer comprising:
a hollow input shaft (100) having a driving surface (110) formed on the inside thereof;
an output shaft (200) accommodated inside the input shaft (100) and having an output shaft body (210) and an output shaft gear (220) formed on an outer peripheral surface of the output shaft body (210) in a circumferential direction of the output shaft body (210);

a plurality of rollers (R) alignedly disposed between the output shaft (200) and the driving surface (110) and extending axially; and ring-shaped caps (300) positioned on both axial sides of the plurality of rollers (R), wherein a radial movement of the plurality of rollers (R) is guided by means of the caps (300), and if the input shaft (100) rotates, the plurality of rollers (R) is pressurized against the driving surface (110) to thus pressurize the output shaft gear (220), so that the output shaft (200) rotates.

2. The reducer according to claim 1, wherein each cap (300) has a plurality of guide grooves (320) spaced apart from one another on an axial inner surface thereof in a circumferential direction thereof to guide the plurality of rollers (R) radially, and both longitudinal sides of the plurality of rollers (R) are inserted into the guide grooves (320) and guided in the radial movement, so that as the plurality of rollers (R) is pressurized against the driving surface (110) to thus pressurize the output shaft gear (220), the output shaft (200) rotates.

3. The reducer according to claim 1, further comprising elastic rings (500) adapted to insert the output shaft (200) thereinto, located on both axial sides of the output shaft gear (220), and to outwardly pressurize the rollers (R) toward the driving surface (110).

4. The reducer according to claim 2, further comprising extension portions (230) extending axially from both sides of the output shaft body (210) and located inside the caps (300) and output shaft members (400) coupled to the extension portions (230) on axial outer surfaces thereof and rotating integrally with the output shaft (200).

5. The reducer according to claim 4, wherein each cap (300) has a ring-shaped body (310), the guide grooves (320) formed on a first side surface as the axial inner surface (310B) of the cap body (310), and a first seating portion (330) formed on a second side surface as an axial outer surface (310A) of the cap body (310) to seat the corresponding output shaft member (400) thereonto, the first seating portion (330) protruding by a given distance outwardly from the inner peripheral end of the second side surface (310A) and having a thickness reduced by a given depth to form a stepped protrusion, between the corresponding output shaft member (400) and the corresponding first seating portion (330) being disposed a second bearing (BRG2), and the output shaft members (400) and the output shaft (200) are coupled to one another by means of fixing members (F1) and rotate integrally with one another.

6. The reducer according to claim 5, wherein each cap (300) has a second seating portion (340) formed steppedly to a given thickness on an outer end periphery of the second side surface (310A) of the cap body (310) as the side surface toward the input shaft (100), and between the second seating portions (340) and the input shaft (100) are disposed first bearings (BRG1).

7. The reducer according to claim 5, wherein each cap member (420) has insertion grooves formed on the bottom thereof in a circumferential direction thereof, and each first seating portion (330) has insertion holes passing therethrough in a circumferential direction thereof, so that through coupling pins inserted into the insertion grooves and the insertion holes, the cap members (420) and the caps (300) rotate integrally with one another.

* * * * *